(12) United States Patent
Miura et al.

(10) Patent No.: US 10,939,079 B2
(45) Date of Patent: Mar. 2, 2021

(54) DISPLAY APPARATUS

(71) Applicant: SONY CORPORATION, Tokyo (JP)

(72) Inventors: Koji Miura, Kanagawa (JP); Takeshi Tanimoto, Kanagawa (JP); Keita Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/647,702

(22) PCT Filed: Aug. 17, 2018

(86) PCT No.: PCT/JP2018/030542
§ 371 (c)(1),
(2) Date: Mar. 16, 2020

(87) PCT Pub. No.: WO2019/064985
PCT Pub. Date: Apr. 4, 2019

(65) Prior Publication Data
US 2020/0260056 A1 Aug. 13, 2020

(30) Foreign Application Priority Data

Sep. 29, 2017 (JP) .............................. JP2017-191653

(51) Int. Cl.
*H04N 9/31* (2006.01)
(52) U.S. Cl.
CPC .................................. *H04N 9/3111* (2013.01)
(58) Field of Classification Search
CPC .. H04N 9/3114; H04N 9/3155; H04N 9/3117; H04N 9/3111; H04N 9/3164;
(Continued)

(56) References Cited

U.S. PATENT DOCUMENTS

| 2004/0155856 A1* | 8/2004 | Richards ............. H04N 9/3114 345/102 |
| 2007/0013965 A1 | 1/2007 | Iwanaga et al. |
| 2009/0174824 A1* | 7/2009 | Shirai ................... G09G 3/346 348/760 |

FOREIGN PATENT DOCUMENTS

| JP | 2000-227782 | 8/2000 |
| JP | 2007-047768 | 2/2007 |

(Continued)

OTHER PUBLICATIONS

International Search Report prepared by the Japan Patent Office on Oct. 30, 2018, for International Application No. PCT/JP2018/030542.

*Primary Examiner* — Sherrie Hsia
(74) *Attorney, Agent, or Firm* — Sheridan Ross P.C.

(57) ABSTRACT

A display apparatus of the present disclosure includes: a light source section that outputs a light beam of a plurality of predetermined colors; an image data processing section that generates a sub-frame image of a single color by dividing a unit frame into a plurality of sub-frames, on the basis of an input image signal, and generates a sub-frame image of a mixed color based on the image signals of at least two colors; a display device that modulates the light beam based on the sub-frame images generated by the image data processing section; and a light source control section that causes the light source section to output the light beam of the color corresponding to the sub-frame image of the single color, in a selected period, and causes the light source section to output the light beams of the at least two colors sequentially.

20 Claims, 9 Drawing Sheets (58) Field of Classification Search
CPC ...... H04N 9/3182; H04N 9/31; H04N 9/3161; G09G 3/3413; G09G 3/2022; G09G 3/3406; G09G 3/22; G03B 21/2033; G03B 21/201; G03B 33/08
USPC .............. 348/760, 742, 743; 353/30, 31, 33
See application file for complete search history.

(56) References Cited

FOREIGN PATENT DOCUMENTS

| | | |
|---|---|---|
| JP | 2007-310286 | 11/2007 |
| JP | 2015-038544 | 2/2015 |
| WO | WO 2008/007505 | 1/2008 |
| WO | WO 2017/164080 | 9/2017 |

\* cited by examiner

DISPLAY APPARATUS

CROSS REFERENCE TO RELATED APPLICATIONS

This application is a national stage application under 35 U.S.C. 371 and claims the benefit of PCT Application No. PCT/JP2018/030542 having an international filing date of 17 Aug. 2018, which designated the United States, which PCT application claimed the benefit of Japanese Patent Application No. 2017-191653 filed 29 Sep. 2017, the entire disclosures of each of which are incorporated herein by reference.

TECHNICAL FIELD

The present disclosure relates to a display apparatus that performs color display using a field sequential method.

BACKGROUND ART

For example, there is known a color display apparatus employing a field sequential method that divides a unit frame (one frame) into a plurality of sub-frames (fields), and displays images of respective colors necessary for color display sequentially in time division within the unit frame. For example, there is known a display apparatus that irradiates one display device with a light beam of each of colors of R (red), G (green), and B (blue) sequentially for each of sub-frames, and modulates the light beam, and thereby displays images of the respective colors sequentially in time division within a unit frame. For such a display apparatus, an RGBW light emission method aiming for higher luminance and color break (color break up) reduction is in practical use. In the RGBW light emission method, a display device is irradiated with a light beam of W (white) in addition to light beams of the respective colors of R, G, and B sequentially within a unit frame, and displays a sub-frame image of W in addition to sub-frame images of the respective colors of R, G, and B.

CITATION LIST

Patent Literature

PTL 1: Japanese Unexamined Patent Application Publication No. 2015-38544

SUMMARY OF THE INVENTION

In a case where an RGBW light emission method such as the one described above is to be achieved, it is possible to generate a light beam of white by, for example, simultaneously turning on light sources of the respective colors of R, G, and B. However, in that case, a necessary amount of current in a drive circuit of each of the light sources may increase, and thus a circuit size may become large. Further, a heat quantity may increase and thus cooling of a light source section may be necessary.

It is desirable to provide a display apparatus that makes it possible to reduce a color break, while suppressing heat generation and an increase in size of a light source section and a drive circuit thereof.

A display apparatus according to an embodiment of the present disclosure includes: a light source section that outputs a light beam of each of a plurality of predetermined colors; an image data processing section that generates a sub-frame image of a single color of each of the plurality of predetermined colors by dividing a unit frame into a plurality of sub-frames, on the basis of an input image signal including an image signal of each of the plurality of predetermined colors, and generates a sub-frame image of a mixed color different from the plurality of predetermined colors, on the basis of the image signals of at least two colors among the plurality of predetermined colors; a display device that modulates the light beam outputted from the light source section, on the basis of each of the sub-frame images generated by the image data processing section; and a light source control section that causes the light source section to output the light beam of the color corresponding to the sub-frame image of the single color, in a period of displaying the sub-frame image of the single color, and causes the light source section to output the light beams of the at least two colors sequentially in time division, in a period of displaying the sub-frame image of the mixed color, within a period of the unit frame.

In the display apparatus according to the embodiment of the present disclosure, within the period of the unit frame, the light beam of the color corresponding to the sub-frame image of the single color is outputted from the light source section, in the period of displaying the sub-frame image of the single color. In the period of displaying the sub-frame image of the mixed color, the light beams of the at least two colors are outputted from the light source section sequentially in time division.

In the display apparatus according to the embodiment of the present disclosure, the light beams of the at least two colors are outputted from the light source section sequentially in time division, in the period of displaying the sub-frame image of the mixed color different from the predetermined colors, and thus, it is possible to reduce a color break while suppressing heat generation and an increase in size of a light source section and a drive circuit thereof.

It is to be noted that effects described here are not necessarily limitative, and any of effects described in the present disclosure may be provided.

MODES FOR CARRYING OUT THE INVENTION

Some embodiments of the present disclosure are described below in detail with reference to the drawings. It is to be noted that the description is given in the following order.
1. First Embodiment (FIG. 1 to FIG. 9)
   1.1 Description of Optical System of Display Apparatus
   1.2 Description of Control System of Display Apparatus
   1.3 Specific Examples (Modification Examples) of Image Display and Light Source Control
   1.4 Effects
2. Second Embodiment (FIG. 10)
   2.1 Modification Example of Display Device and Light Source Section
3. Other Embodiments

1. First Embodiment

In a projector (a projection display apparatus), a direct-viewing-type image display apparatus, or the like configured by only one display device, full-color display employing a field sequential method is performed by adopting, for example, an RGB sequential lighting method of sequentially turning on light sources of respective colors of R, G, and B, in a light source section. Further, as another configuration example of a light source section in a display apparatus employing a field sequential method, there is also a method of irradiating a rotation color filter including filters of the respective colors of R, G, and B with a light beam from a white light source, thereby sequentially switching light beams of the respective colors. For a display device to be used for such a display apparatus, for example, HTPS (High Temperature Poly-Silicon), LCOS (Liquid Crystal On Silicon), DMD (Digital Micromirror Device), and the like are known.

For such a display apparatus, a RGBW light emission method aiming for higher luminance and color break reduction is in practical use. In a case where the RGBW light emission method is implemented in a projector or the like in which a light source section includes light sources of the respective colors of R, G, and B, and one display device is included, it is common to cause light emission from the light source of each of the colors of R, G, and B simultaneously, for light emission of white. However, in a case where the simultaneous light emission from the light source of each of the colors of R, G, and B is performed, the number of times color sequential switching is executed within a unit frame increases only by one, as compared with an ordinary RGB sequential lighting method, and thus, an effect of color break reduction is not much obtained.

For this reason, in many cases, the simultaneous light emission from the light source of each of the colors of R, G, and B is performed in a light emission period of white, by the RGBW light emission method, mainly for the purpose of higher luminance. However, in the case of the RGBW light emission method, a heat quantity of the light source increases as compared with the ordinary RGB sequential lighting method, and thus, cooling of the light source may be necessary, and a cooling mechanism having a large size may also be necessary. Further, a necessary amount of current of a drive circuit of the light source may increase, and thus, a circuit size may increase, or cooling of the circuit may be necessary due to an increase in heat quantity.

Hence, there are expectations for development of a technology that makes it possible to reduce a color break, while suppressing heat generation and an increase in size of a light source section and a drive circuit thereof, in a display apparatus.

1.1 Description of Optical System of Display Apparatus

[Overall Configuration of Display Apparatus]

Figure 1:
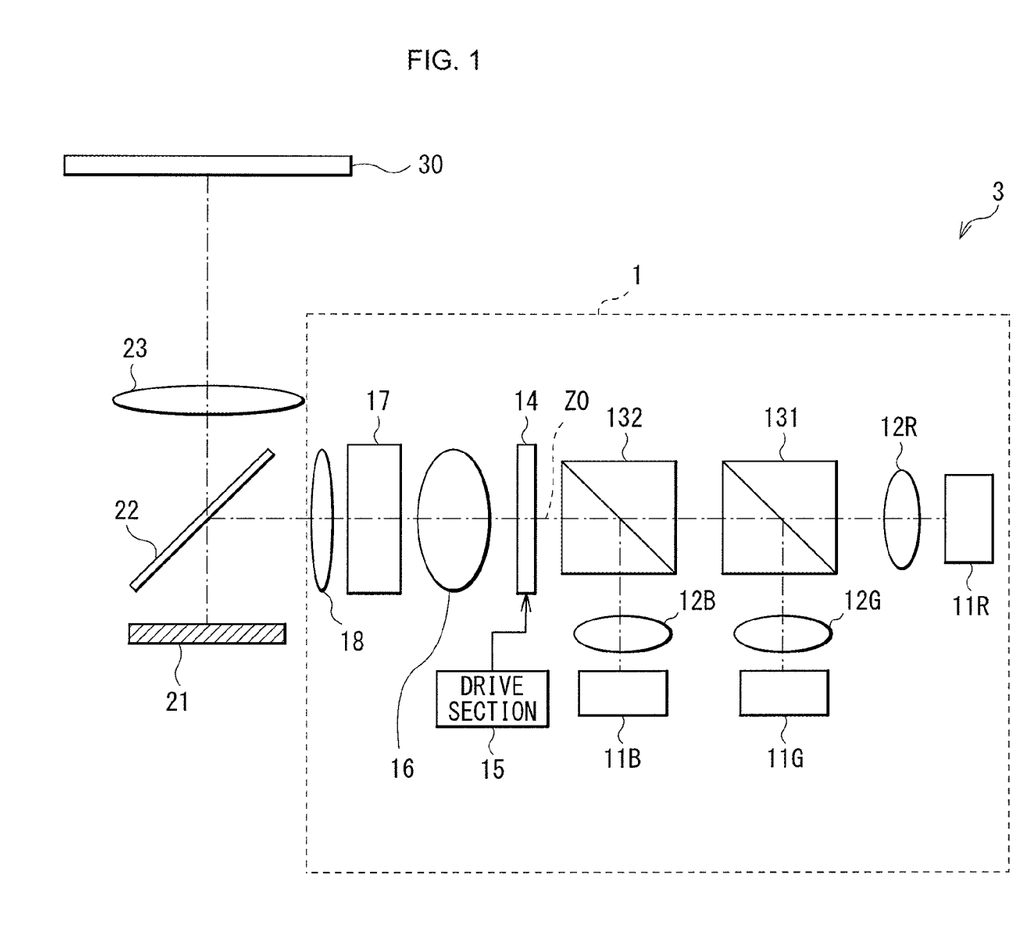
FIG. 1 is a configuration diagram illustrating an example of an optical system of a display apparatus according to a first embodiment of the present disclosure.

FIG. 1 illustrates a configuration example of a display apparatus 3 according to a first embodiment of the present disclosure.

The display apparatus 3 is a projector (a projection display apparatus) that projects an image (image light) onto a screen 30 (a projection surface), and includes an illumination unit 1, and an optical system (a display optical system) that performs image display using illumination light from the illumination unit 1. It is to be noted that, in FIG. 1, Z0 is assumed to be an optical axis.

(Illumination Unit 1)

The illumination unit 1 is a light source section that outputs light beams of a plurality of predetermined colors. In the present embodiment, the illumination unit 1 outputs light beams of respective colors of R, G, and B in time division, as the light beams of the plurality of predetermined colors. The illumination unit 1 includes a red laser 11R, a green laser 11G a blue laser 11B, coupling lenses 12R, 12G, and 12B, dichroic prisms 131 and 132, an optical device 14, a drive section 15, a collimator lens 16, a fly-eye lens 17, and a condensing lens 18.

The red laser 11R, the green laser 11G, and the blue laser 11B are three kinds of light sources that emit a red laser beam, a green laser beam, and a blue laser beam, respectively. Each of these three kinds of light sources is a laser light source (LD (Laser Diode)). A wavelength $\lambda r$ of the red laser beam by the red laser 11R may be in a range of about 600 nm to about 700 nm, and may be, specifically, about 640 nm. A wavelength $\lambda g$ of the green laser beam may be, for example, in a range of about 500 nm to about 600 nm, and may be, specifically, about 520 nm. A wavelength $\lambda b$ of the blue laser beam may be, for example, in a range of about 400 nm to about 500 nm, and may be, specifically, about 450 nm. It is to be noted that an LED (Light Emitting Diode) and an OLED (Organic Light Emitting Diode) may each be used as the light source.

The coupling lenses 12R and 12G are lenses intended to collimate the red laser beam outputted from the red laser 11R and the green laser beam outputted from the green laser 11G, respectively, and couple the collimated beams (as parallel light) with the dichroic prism 131. Similarly, the coupling lens 12B is a lens intended to collimate the laser beam outputted from the blue laser 11B, and couple the collimated beam (as parallel light) with the dichroic prism 132. It is to be noted that, here, the entering laser beams are collimated (are converted to the parallel light) by the respective coupling lenses 12R, 12G, and 12B, but are not limited to this case, and may not be collimated (may not be converted to the parallel light) by the respective coupling lenses 12R, 12G, and 12B. However, thus collimating the laser beams makes it possible to achieve a reduction in size of an apparatus configuration, and thus is more desirable.

The dichroic prism 131 is a prism that selectively reflects the green laser beam entering through the coupling lens 12G, while selectively allowing the red laser beam entering through the coupling lens 12R to pass therethrough. The dichroic prism 132 is a prism that selectively reflects the blue laser beam entering through the coupling lens 12B, while selectively allowing the red laser beam and the green laser beam outputted from the dichroic prism 131 to pass therethrough. Color composition (optical-path synthesis) is thereby performed for the red laser beam, the green laser beam, and the blue laser beam.

It is to be noted that a dichroic mirror may be used in place of each of the dichroic prisms 131 and 132.

The optical device 14 is disposed on an optical path of the beam outputted from each of the red laser 11R, the green laser 11G, and the blue laser 11B. The optical device 14 is disposed, specifically, on an optical path between the dichroic prism 132 and the collimator lens 16. The optical device 14 is a device intended to reduce speckle noise (an interference pattern).

The drive section 15 changes one or both of an incident position and an incident angle (the incident position, the incident angle, or both of the incident position and the incident angle) of the laser beam, within an incident surface of the fly-eye lens 17, by displacing a relative position between the optical device 14 and the fly-eye lens 17. The drive section 15 causes vibration (micro vibration) of the optical device 14. A vibration direction of the optical device 14 by the drive section 15 is, for example, a direction orthogonal to a sheet surface of FIG. 1. The drive section 15 includes, for example, a coil, a permanent magnet (e.g., a permanent magnet including a material such as neodymium (Nd), iron (Fe), and boron (B)), etc. It is to be noted that examples of each of the displacement of the relative position described above, and a displacement of one or both of the incident position and the incident angle include a periodical displacement (change), but are not limited to this case, and other displacement (change) technique may be adopted. Further, examples of a drive technique by this drive section 15 include a technique of causing reciprocating displacement of the above-described relative position by a drive frequency of a predetermined frequency (e.g., 15 Hz) or more.

The fly-eye lens 17 is an equalization optical member that equalizes an illumination distribution of light. The fly-eye lens 17 is, for example, an integrator in which a plurality of unit lenses is two-dimensionally arranged on a substrate, and spatially divides an entering light flux depending on an array of the plurality of unit lenses to be outputted. The light to be outputted from the fly-eye lens 17 is thereby equalized (an in-plane intensity distribution is equalized) and the equalized light is outputted as illumination light.

The condensing lens 18 is a lens intended to condense the light (the illumination light) entering upon being equalized by the fly-eye lens 17.

(Display Optical System)

The display optical system described above is configured by using a polarization beam splitter (PBS; Polarization Beam Splitter) 22, a reflection-type liquid crystal device 21, and a projection lens 23 (a projection optical system).

The polarization beam splitter 22 is an optical member that selectively reflects specific polarized light (e.g., s-polarized light), and selectively allows other polarized light (e.g., p-polarized light) to pass therethrough. Hence, the illumination light (e.g., the s-polarized light) from the illumination unit 1 enters the reflection-type liquid crystal device 21 after being selectively reflected, and the image light (e.g., the p-polarized light) outputted from this reflection-type liquid crystal device 21 enters the projection lens 23 after being selectively allowed to pass through.

The polarization beam splitter 22 may be, for example, a configuration in which prisms each coated with a multilayer film are joined. Further, the polarization beam splitter 22 may be a device (such as a wire grid or a polarization film) having a polarization property, or may be a beam splitter similar to prisms between which this device is sandwiched.

The reflection-type liquid crystal device 21 is a display device (a light modulation device) that outputs the image light by reflecting the illumination light from the illumination unit 1 while modulating this illumination light on the basis of an image signal. At this time, in the reflection-type liquid crystal device 21, reflection is performed to make the polarized light at incident time and the polarized light at output time (e.g., the s-polarized light or the p-polarized light) be different from each other. Such a reflection-type liquid crystal device 21 includes, for example, a liquid crystal device such as LCOS (Liquid Crystal On Silicon).

The projection lens 23 is a projection optical system that performs projection (magnified projection) of the illumination light (the image light) modulated by the reflection-type liquid crystal device 21 onto the projection surface (the screen 30).

(Display Operation)

In the display apparatus 3, first, in the illumination unit 1, the light beams (the laser beams) outputted from the red laser 11R, the green laser 11G and the blue laser 11B are collimated by the coupling lenses 12R, 12G, and 12B respectively, and thereby converted to the parallel light. Next, the laser beams (the red laser beam, the green laser beam, and the blue laser beam) thus converted to the parallel light are subjected to the color composition (the optical-path synthesis) by the dichroic prisms 131 and 132. The laser beams subjected to the optical-path synthesis pass through the optical device 14, and then enter the collimator lens 16 and the fly-eye lens 17. This entering light is equalized (subjected to the equalization of the in-plane intensity distribution) by the fly-eye lens 17, and the equalized light is outputted and then condensed by the condensing lens 18. In this way, the illumination light is outputted from the illumination unit 1.

Next, this illumination light is selectively reflected by the polarization beam splitter 22 and then enters the reflection-type liquid crystal device 21. In the reflection-type liquid crystal device 21, this entering light is reflected while being modulated on the basis of the image signal, and is thereby outputted as the image light. Here, in this reflection-type liquid crystal device 21, the polarized light at the incident time and the polarized light at the output time are different, and thus, the image light outputted from the reflection-type liquid crystal device 21 is selectively allowed to pass through the polarization beam splitter 22, and then enters the projection lens 23. Subsequently, this entering light (image light) is projected (subjected to the magnified projection) onto the screen 30 by the projection lens 23.

At this time, the red laser 11R, the green laser 11G, and the blue laser 11B sequentially perform light emission (pulse emission) in time division, and output the respective laser beams (the red laser beam, the green laser beam, and the blue laser beam). Subsequently, in the reflection-type liquid crystal device 21, on the basis of the image signals of respective color components (a red component, a green component, and a blue component), the laser beams of the respective colors are sequentially modulated in time division. Color image display based on the image signals is thereby performed in the display apparatus 3.

1.2 Description of Control System of Display Apparatus (Basic Configuration of Control System of Display Apparatus)

Figure 2:
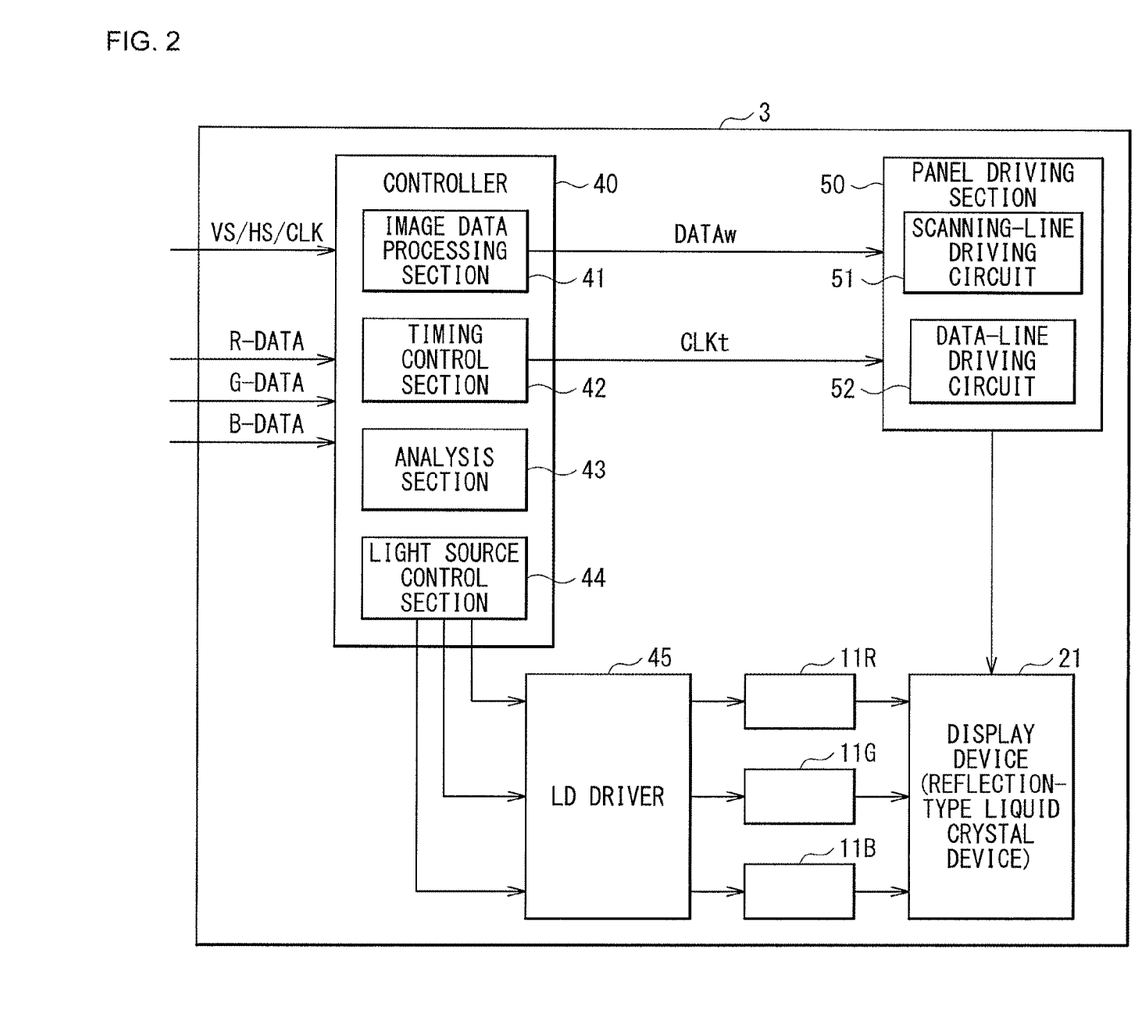
FIG. 2 is a block diagram illustrating a configuration example of a control system of the display apparatus according to the first embodiment.

FIG. 2 illustrates a configuration example of a control system of the display apparatus 3 illustrated in FIG. 1.

First, as a basic configuration of the control system, there is described below a configuration example in which RGB sequential lighting is performed in the light source section and a sub-frame image of each of the colors of R, G, and B is displayed within a period of a unit frame. However, in the display apparatus 3 according to the present embodiment, actually, as described later, a sub-frame image of a mixed color (e.g., a sub-frame image of W (white)) of at least two colors among R, G, and B is generated, and the sub-frame image of each of the colors of R, G, and B and the sub-frame image of the mixed color are sequentially displayed within the period of the unit frame. For this reason, actually, as described later, light source control is performed by, for example, RGBW sequential light emission for the light source section.

The display apparatus 3 includes a controller 40, an LD driver 45, and a panel driving section 50, as the control system.

The controller 40 includes an image data processing section 41, a timing control section 42, an analysis section 43, and a light source control section 44. The panel driving section 50 includes a scanning-line driving circuit 51 and a data-line driving circuit 52.

The controller 40 includes, for example, a logical operation circuit such as a CPU (Central Processing Unit), and controls each portion of the display apparatus 3. To the controller 40, various control signals including a horizontal synchronizing signal HS, a vertical synchronizing signal VS, and a clock signal CLK, as well as an input image signal are inputted in parallel. The input image signal includes image signals of a plurality of predetermined colors (input image data). Here, input image data R-DATA, G-DATA, and B-DATA corresponding to the colors of R, G, and B, respectively, are inputted to the controller 40, as the image signals of the plurality of predetermined colors. Each of the control signals and the input image data to be inputted to the controller 40 are generated, for example, by an image signal source (e.g., a reproducing apparatus dedicated to any of various media, and an image reproducing apparatus such as a personal computer) provided outside the display apparatus 3, and then inputted to the controller 40.

The input image data R-DATA, G-DATA, and B-DATA are image data intended to form an image of one frame serving as the unit frame, on the reflection-type liquid crystal device 21 serving as the display device. The input image data R-DATA, G-DATA, and B-DATA are inputted for one frame (i.e., for all pixels of the reflection-type liquid crystal device 21) at, for example, a cycle of 16.7 milliseconds (i.e., a frame frequency of 60 Hz). Here, the frame refers to a period necessary for forming an image for one frame, by driving the pixels of the reflection-type liquid crystal device 21.

The display apparatus 3 performs image formation of field sequential driving, by dividing (by performing time division of) one frame into a plurality of fields (sub-frames), generating an image of any of the color components of R, G, and B for each of the sub-frames (hereinafter referred to as "sub-frame image"), and displaying the generated image. The input image data R-DATA is input image data intended to generate the sub-frame image corresponding to the R color (hereinafter referred to as "R sub-frame image"), and is data in which an R-color gray-scale value is designated for each of the pixels. The input image data G-DATA is input image data intended to generate the sub-frame image corresponding to the G color (hereinafter referred to as "G sub-frame image"), and is data in which a G-color gray-scale value is designated for each of the pixels. The input image data B-DATA is input image data intended to generate the sub-frame image corresponding to the B color (hereinafter referred to as "B sub-frame image"), and is data in which a B-color gray-scale value is designated for each of the pixels. The gray-scale value of each of the colors of R, G, and B is expressed by, for example, 8-bit (i.e., 256 gray-scale) data. In this case, the gray-scale value assumes a value of any of "0" to "255", and the larger the value is, the brighter (i.e., higher in luminance) the corresponding gray-scale is, whereas the smaller the value is, the darker (i.e., lower in luminance) the corresponding gray-scale is.

The image data processing section 41 is a processing circuit that accumulates the input image data R-DATA, G-DATA, and B-DATA inputted in parallel in a frame memory not illustrated, and outputs the data to the panel driving section 50 after performing parallel-serial conversion. The image data processing section 41 generates image data DATAw intended for display of the sub-frame images of the respective colors of R, G, and B in time division and outputs the generated image data DATAw to the panel driving section 50.

The timing control section 42 is a circuit that generates various timing signals and outputs the generated timing signals to the panel driving section 50. Specifically, the timing control section 42 generates a timing signal CLKt for the scanning-line driving circuit 51 and the data-line driving circuit 52, on the basis of the horizontal synchronizing signal HS, the vertical synchronizing signal VS, and the clock signal CLK, and outputs the generated timing signal CLKt to the scanning-line driving circuit 51 and the data-line driving circuit 52.

The analysis section 43 is a circuit that calculates a gray-scale difference $\Delta V$ of each of the R, G, and B colors for each of the pixels by analyzing the input image data R-DATA, G-DATA, and B-DATA, and thereby determines a histogram (i.e., a frequency distribution) of the gray-scale difference $\Delta V$.

The light source control section 44 is a circuit that performs control (i.e., light source control) of causing each of the red laser 11R, the green laser 11G, and the blue laser 11B serving as the light source to output the light beam. Specifically, the light source control section 44 outputs a light source control signal that provides an instruction for turning-on or turning-off for each of the red laser 11R, the green laser 11G, and the blue laser 11B, to the LD driver 45. The LD driver 45 turns on or turns off each of the red laser 11R the green laser 11G, and the blue laser 11B, depending on the supplied light source control signal. The red laser 11R, the green laser 11G, and the blue laser 11B each output the laser beam during a turned-on period. The light source control section 44 may perform the light source control depending on the histogram of the gray-scale difference $\Delta V$ determined by the analysis section 43, as necessary.

(Description of Light Source Control by RGBW Sequential Light Emission)

In the above description, it is described that the RGB sequential lighting is performed in the light source section, and the sub-frame image of each of the colors of R, G, and B is displayed within the period of the unit frame, but in the display apparatus 3 according to the present embodiment, actually, the sub-frame image of the mixed color different from R, G, and B is generated, and the sub-frame image of each of the colors of R, G, and B and the sub-frame image of the mixed color are sequentially displayed within the period of the unit frame.

For this reason, on the basis of the input image signal including the image signals of the plurality of predetermined colors, the image data processing section 41 divides the unit frame into the plurality of sub-frames, and generates the sub-frame image of a single color of each of the plurality of predetermined colors, and generates the sub-frame image of the mixed color different from the plurality of predetermined colors, on the basis of the image signals of at least two colors among the plurality of predetermined colors. Here, the plurality of predetermined colors is, for example, R, G, and B. The input image signal is, for example, the input image data R-DATA, G-DATA, and B-DATA. The sub-frame image of the single color is, for example, each of the R sub-frame image, the G sub-frame image, and the B sub-frame image. The display device (the reflection-type liquid crystal device 21) modulates the light beam outputted from the light source section, on the basis of each of the sub-frame images generated by the image data processing section 41.

The light source control section 44 causes the light source section to output the light beam of the color corresponding to the sub-frame image of the single color, in a period of displaying the sub-frame image of the single color, within the period of the unit frame. Further, the light source control section 44 causes the light source section to output the light beams of the at least two colors sequentially in time division, in a period of displaying the sub-frame image of the mixed color.

As an example, a case where the sub-frame image of the mixed color is the sub-frame image of W (white) (hereinafter referred to as "W sub-frame image") and the light source control by the RGBW sequential light emission is performed is described below with reference to FIG. 3 and FIG. 4. In this case, the light source control section 44 causes the light source section to output all the light beams of the respective plurality of predetermined colors sequentially at least once or more in time division, in the period of displaying the sub-frame image of the mixed color. Further, it is desirable that the light source control section 44 perform the light source control to make white balance in the period of displaying the sub-frame image of the mixed color and white balance in the unit frame become substantially the same.

Figure 3:
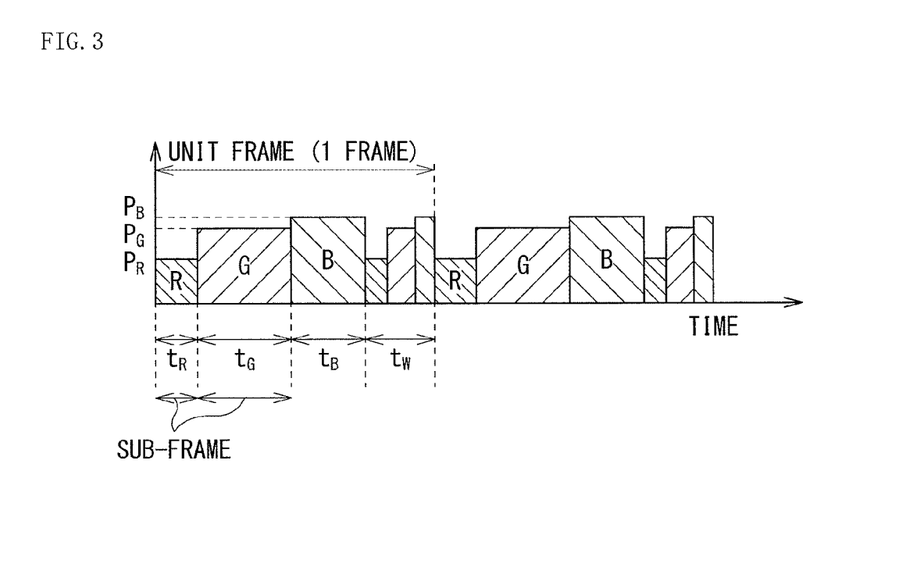
FIG. 3 is a timing chart illustrating an example of timing of time-division light emission in the display apparatus according to the first embodiment.

FIG. 3 illustrates an example of timing of time-division light emission in a case where the RGBW sequential light emission is performed in the display apparatus 3. FIG. 4 illustrates a generation example of each of the sub-frame images in the display apparatus 3.

Figure 4:
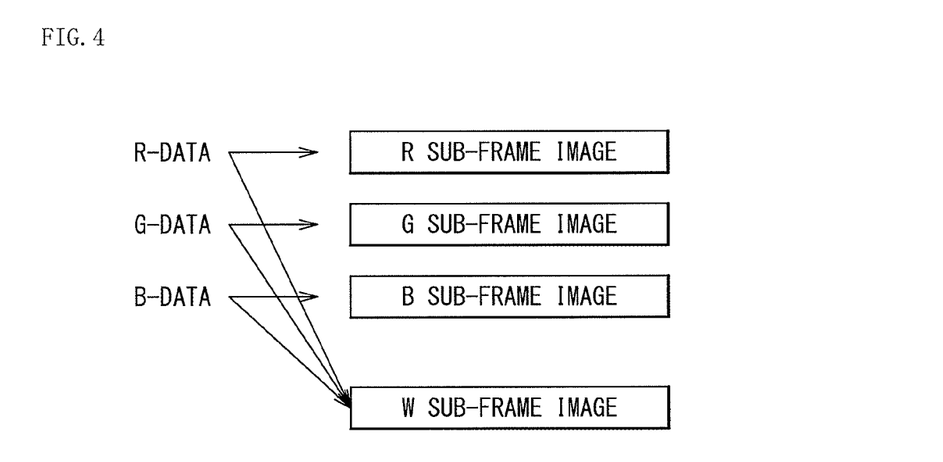
FIG. 4 is an explanatory diagram illustrating a generation example of each of sub-frame images in the display apparatus according to the first embodiment.

As illustrated in FIG. 4, the image data processing section 41 generates the R sub-frame image, the G sub-frame image, and the B sub-frame image corresponding to the input image data. R-DATA, the input image data G-DATA, and the input image data B-DATA, respectively. Further, as illustrated in FIG. 4, the image data processing section 41 generates the W sub-frame image, on the basis of a certain operation rule, from each of the input image data R-DATA, G-DATA, and B-DATA. For example, the image data processing section 41 generates the W sub-frame image having predetermined white balance, by multiplying the signal value of each of the colors by a predetermined coefficient, using the signal value of the input image data of a color having a minimum signal value among the input image data R-DATA, G-DATA, and B-DATA, as a reference value.

FIG. 3 illustrates an example of timing of light source control in a case where the R sub-frame image, the G sub-frame image, the B sub-frame image, and the W sub-frame image are displayed in this order within the unit frame, in the display device. $t_R$, $t_G$, $t_B$, and $t_W$ indicate a period of displaying the R sub-frame image, a period of displaying the G sub-frame image, a period of displaying the B sub-frame image, and a period of displaying the W sub-frame image, respectively. $P_R$, $P_G$, and $P_B$ indicate emission intensity (power) of the R light source (the red laser 11R), emission intensity of the G light source (the green laser 11G), and emission intensity of the B light source (the blue laser 11B), respectively. It is to be noted that the number of sub-frames and the period of each of the sub-frames illustrated in FIG. 3 are examples, and implementation in other mode is also possible. For example, as represented by specific examples illustrated in FIG. 5 to FIG. 9 described below, all the periods of the sub-frames may be the same. Further, a plurality of sub-frame images of the same color may be displayed within the unit frame. Furthermore, the emission intensity of the light source of each of the colors is also an example, and implementation in other mode is also possible.

The light source control section 44 causes the R light source (the red laser 11R) to output the light beam in the period $t_R$ of displaying the R sub-frame image. The light source control section 44 causes the G light source (the green laser 11G) to output the light beam in the period $t_G$ of displaying the G sub-frame image. The light source control section 44 causes the B light source (the blue laser 11B) to output the light beam in the period $t_B$ of displaying the B sub-frame image.

In the period $t_W$ of displaying the W sub-frame image, the light source control section 44 causes the R light source, the G light source, and the B light source to output the light beams sequentially in time division, within the period $t_W$. In this way, in the present embodiment, simultaneous light emission of the R light source, the G light source, and the B light source is not performed, even in the period $t_W$ of displaying the W sub-frame image. This suppresses an increase in heat quantity of the light source.

1.3 Specific Examples (Modification Examples) of Image Display and Light Source Control Next, further specific examples (modification examples) of image display and light source control are described with reference to FIG. 5 to FIG. 9. It is to be noted that, in FIG. 5 to FIG. 9, display order (display timing) of the sub-frame images of the respective colors to be displayed in the display device within the unit frame is illustrated in an upper portion. In a lower portion, light emission (lighting) timing of the light source of each of the colors within the unit frame is illustrated. It is to be noted that the specific examples illustrated in FIG. 5 to FIG. 9 are examples, and implementation in other mode is also possible.

Specific Example 1

Figure 5:
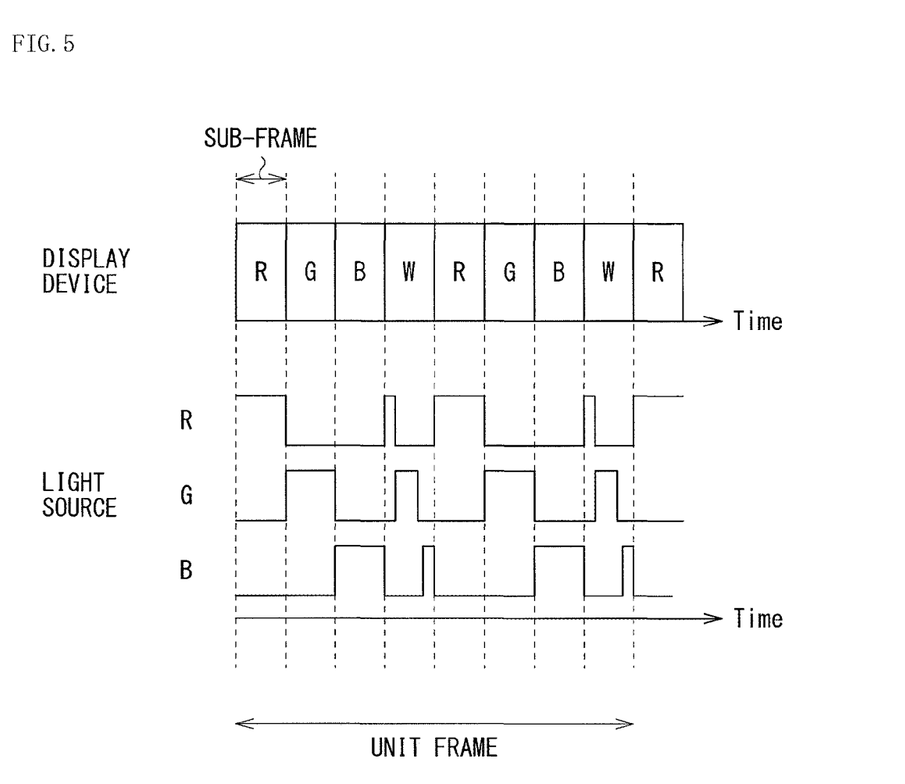
FIG. 5 is a timing chart illustrating a first specific example of time-division display and timing of time-division light emission, in the display apparatus according to the first embodiment.

FIG. 5 illustrates a first specific example of time-division display and timing of time-division light emission in the display apparatus 3.

FIG. 5 illustrates an example in a case where the sub-frame images of the respective colors are displayed in display order of RGBWRGBW within the unit frame. In this example, the light sources output the light beams by time division in order of RGB, in the period when the display device displays the W sub-frame image.

Specific Example 2

Figure 6:
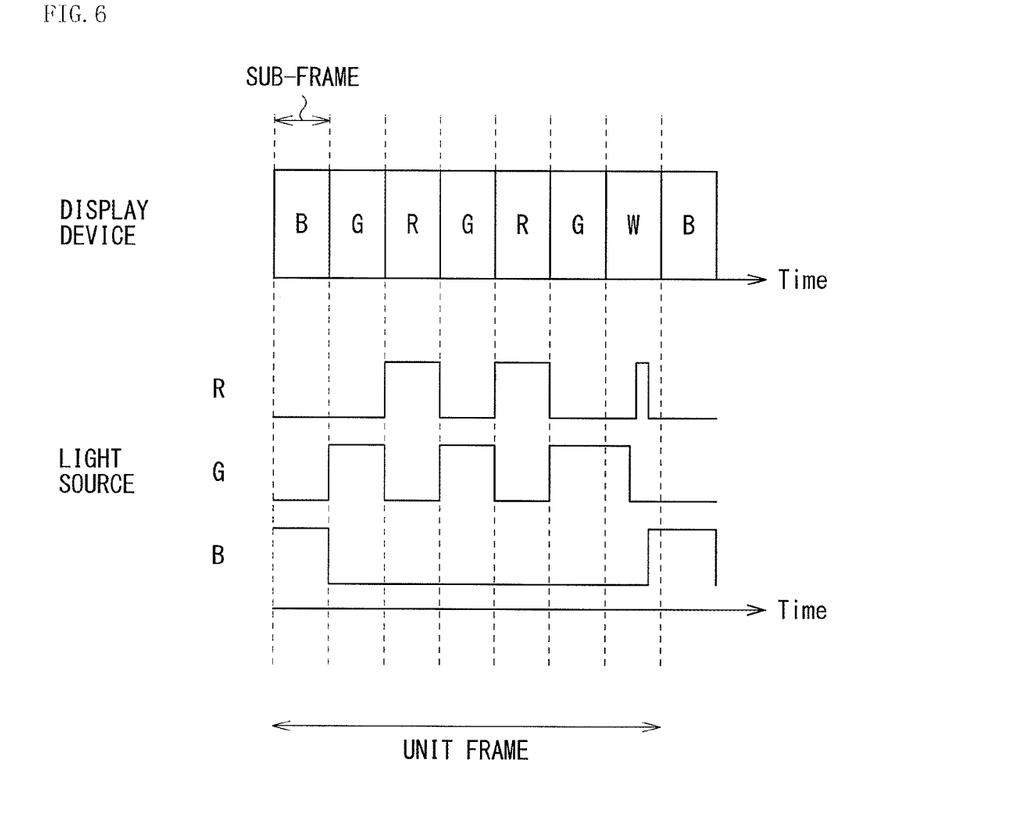
FIG. 6 is a timing chart illustrating a second specific example of time-division display and timing of time-division light emission, in the display apparatus according to the first embodiment.

FIG. 6 illustrates a second specific example of time-division display and timing of time-division light emission in the display apparatus 3.

FIG. 6 illustrates an example in a case where the sub-frame images of the respective colors are displayed in display order of BGRGRGW within the unit frame. In this example, the light sources output the light beams by time division in order of GRB, in the period when the display device displays the W sub-frame image.

In this example, in the period of displaying the W sub-frame image, the light beam of the same color as the color of the sub-frame image of the single color displayed immediately before the W sub-frame image is outputted from the light source section in the first period resulting from the time division. Further, in this example, in the period of displaying the W sub-frame image, the light beam of the same color as the color of the sub-frame image of the single color displayed immediately after the W sub-frame image is outputted from the light source section in the last period resulting from the time division.

In other words, in this example, the sub-frame image immediately before the W sub-frame image is the G sub-frame image, and the sub-frame image immediately after the W sub-frame image is the B sub-frame image. The color of the light source turned on immediately before and that immediately after the period of displaying the W sub-frame image are identical to the color of the light source turned on in the leading (first) period and that in the trailing (last) period within the period of displaying the W sub-frame image, respectively. As a result, in this example, it is possible to reduce an influence of a leak of display color between the sub-frames due to characteristics of the display device, thereby enabling an increase in color gamut by reducing color mixture.

It is to be noted that the configuration of the colors in the period of displaying the W sub-frame image is not limited to the example in FIG. 6. For example, the configuration of the colors within the period of displaying the W sub-frame image may be a configuration in which one unit of R, G, and B combined appears a plurality of times, such as a configuration in order of GRBGRB. Furthermore, the configuration of the colors within the period of displaying the W sub-frame image is not limited to the order of GRB. Still further, the order of the light emission of the light source of each of the colors within the period of displaying the W sub-frame image may not be identical to the color of the light source to be turned on in the leading (first) period and that in the trailing (last) period within the period of displaying the W sub-frame image, unlike the example in FIG. 6. For example, other orders such as RGB and RBG may be adopted.

Further, in the example in FIG. 6, the head of the unit frame is configured in order of BGRGRGW, but is not limited to this example. For example, shifts may occur in order such as GRGWBGR or RGWBGRG.

Specific Example 3

Figure 7:
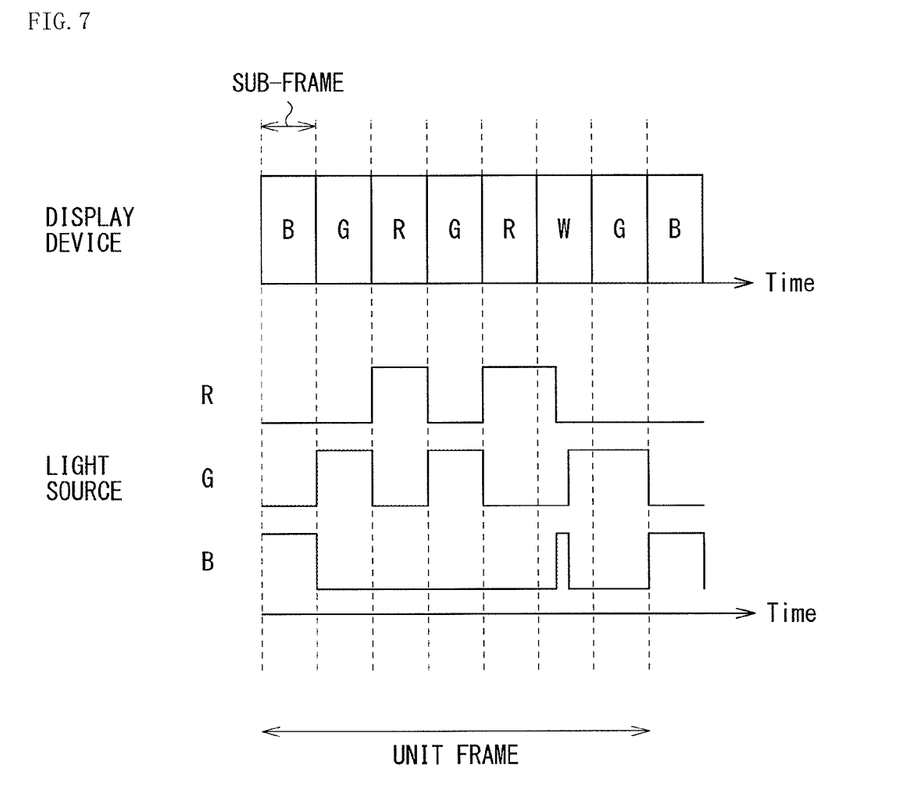
FIG. 7 is a timing chart illustrating a third specific example of time-division display and timing of time-division light emission, in the display apparatus according to the first embodiment.

FIG. 7 illustrates a third specific example of time-division display and timing of time-division light emission in the display apparatus 3.

FIG. 7 illustrates an example in a case where the sub-frame images of the respective colors are displayed in display order of BGRGRWG within the unit frame. In this example, the light sources output the light beams by time division in order of RBG, in the period when the display device displays the W sub-frame image. In this way, within the unit frame, a position (timing) of displaying the W sub-frame image may be in any place in the unit frame.

Specific Example 4

Figure 8:
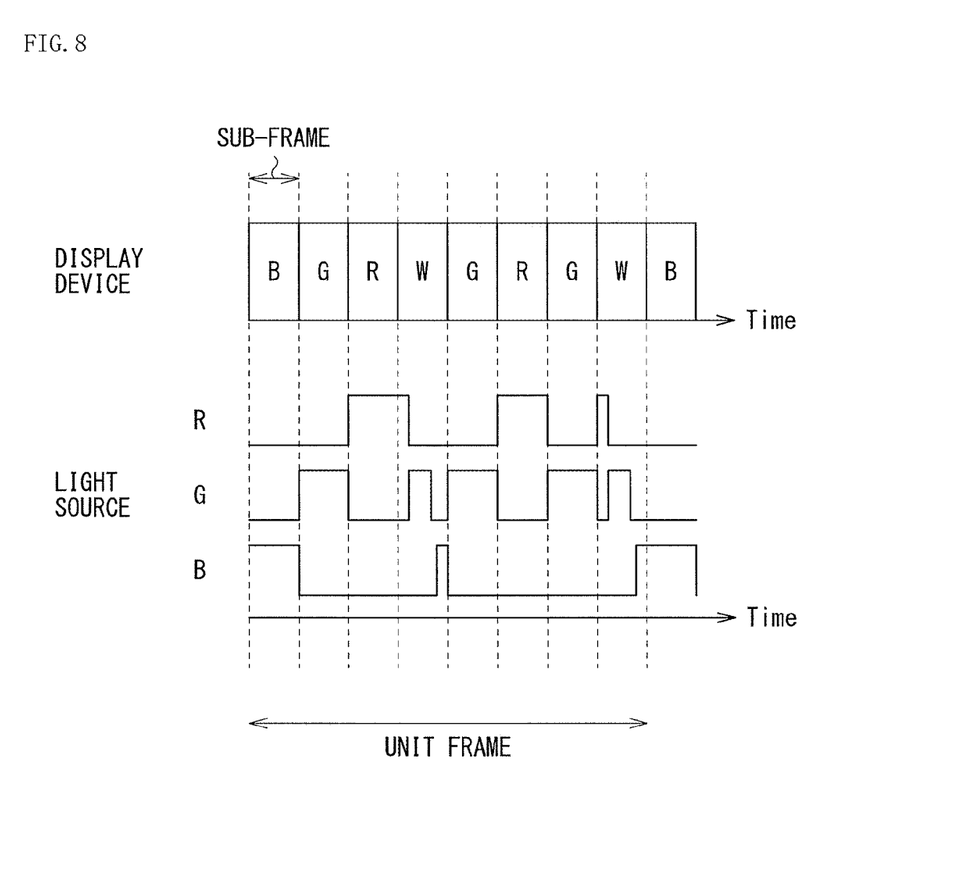
FIG. 8 is a timing chart illustrating a fourth specific example of time-division display and timing of time-division light emission, in the display apparatus according to the first embodiment.

FIG. 8 illustrates a fourth specific example of time-division display and timing of time-division light emission in the display apparatus 3.

FIG. 8 illustrates an example in a case where the sub-frame images of the respective colors are displayed in display order of BGRWGRGW within the unit frame. In this example, the light sources output the light beams by time division in order of RGB, in the period when the display device displays the W sub-frame image. In this example, the two W sub-frame images are present within the unit frame. As in this example, a plurality of W sub-frame images may be present within the unit frame. Further, the periods of displaying the W sub-frame images may be different from each other in terms of the order in which the light source of each of the colors outputs the light beam, within the period when the display device displays the W sub-frame image.

Further, in the above description, the W sub-frame image configured by R, G, and B is defined as an example of the sub-frame image of the mixed color, but the sub-frame image of the mixed color is not limited to the W sub-frame image. For example, a sub-frame image configured by a mixed color of R and G may be defined as a Y (yellow) sub-frame image and additionally displayed. For example, the sub-frame image of each of the colors may be displayed in display order such as BGRYGRGW or RGBYRGBY. Further, a sub-frame image of each of other mixed colors such as C (cyan) and M (magenta) other than Y may be defined and additionally displayed. In a sub-frame period of displaying each of these sub-frame images of other mixed colors, light sources corresponding to the mixed color may be combined and caused to output light beams sequentially.

Specific Example 5

Figure 9:
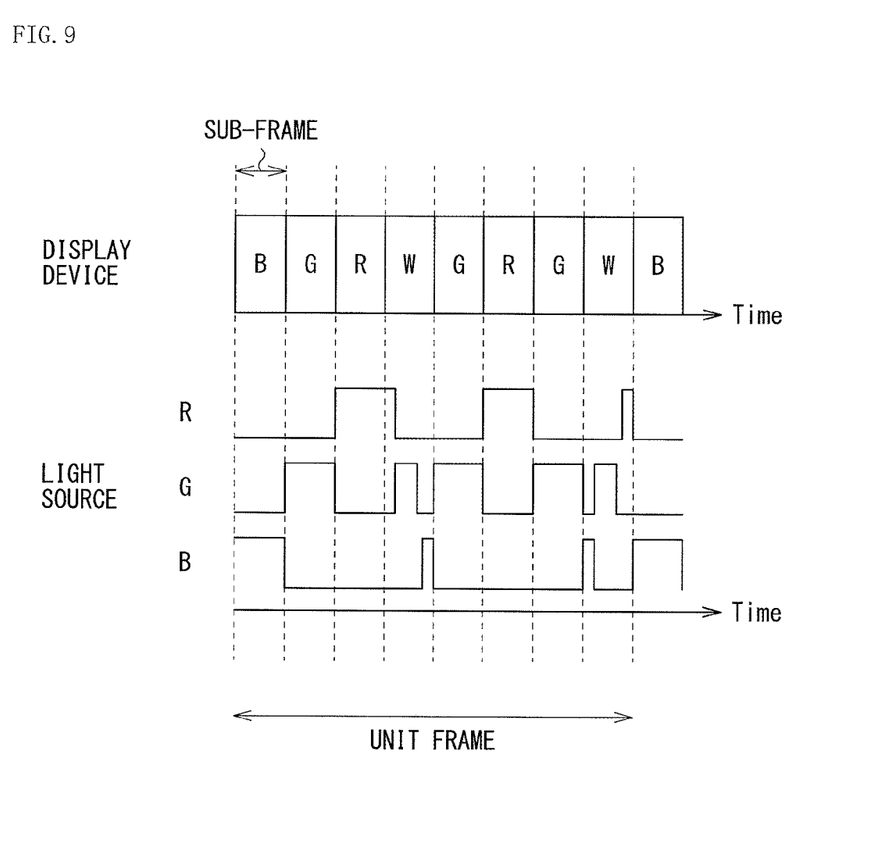
FIG. 9 is a timing chart illustrating a fifth specific example of time-division display and timing of time-division light emission, in the display apparatus according to the first embodiment.

FIG. 9 illustrates a fifth specific example of time-division display and timing of time-division light emission in the display apparatus 3.

FIG. 9 illustrates an example in a case where the sub-frame images of the respective colors are displayed in display order of BGRWGRGW within the unit frame. In this example, the light sources output the light beams by time division in order of RGB, in a first period when the display device displays the W sub-frame image. The light sources output the light beams by time division in order of BGR, in a second period when the display device displays the W sub-frame image. As in this example, in a case where a plurality of periods of displaying the sub-frame image of the mixed color is present within the unit frame, the periods may be different from each other in terms of the order of the colors.

Furthermore, the order of the light emission of the light source of each of the colors in each of the periods of displaying the W sub-frame images may be identical to the color of the light source turned on in the leading (first) period and that in the trailing (last) period within each of the periods of displaying the W sub-frame images. For example, as compared with the example in FIG. 9, the order of the colors of the respective light sources may be RBG in the first period of displaying the W sub-frame image, and may be GRB in the second period of displaying the W sub-frame image.

1.4 Effects

As described above, according to the present embodiment, the light source section outputs the light beams of the at least two colors sequentially in time division, in the period of displaying the sub-frame image of the mixed color different from the predetermined colors, and thus, it is possible to reduce a color break while suppressing heat generation and an increase in size of the light source section and the drive circuit thereof. This makes it possible to achieve a small and lightweight projector, and provide an experience of a high-definition image with suppressed noise.

It is to be noted that the effects described in the present specification are merely exemplified and are not limitative, and may include other effects. The same holds true for effects of the following other embodiments.

2. Second Embodiment

Next, a display apparatus according to a second embodiment of the present disclosure is described. It is to be noted that, in the following, components that are substantially the same as those of the display apparatus according to the above-described first embodiment are denoted by the same reference numerals, and the descriptions thereof are omitted where appropriate.

2.1 Modification Example of Display Device and Light Source Section

In the display apparatus 3 illustrated in FIG. 1, the configuration example of the reflection-type liquid crystal device 21 is described as the display device, but a configuration using a transmission-type liquid crystal device or a DMD as the display device may be adopted.

Further, in the display apparatus 3 illustrated in FIG. 1, the configuration example including the light sources (the red laser 11R, the green laser 11G, and the blue laser 11B) of the respective colors is described as the light source section, but other configurations may be adopted. For example, there may be adopted a configuration including a rotation member that includes a plurality of single-color regions corresponding to the respective plurality of predetermined colors, and a mixed-color region corresponding to the at least two colors, and outputs the color corresponding to each of the regions by each of the regions being irradiated with the light beam from the light source.

Figure 10:
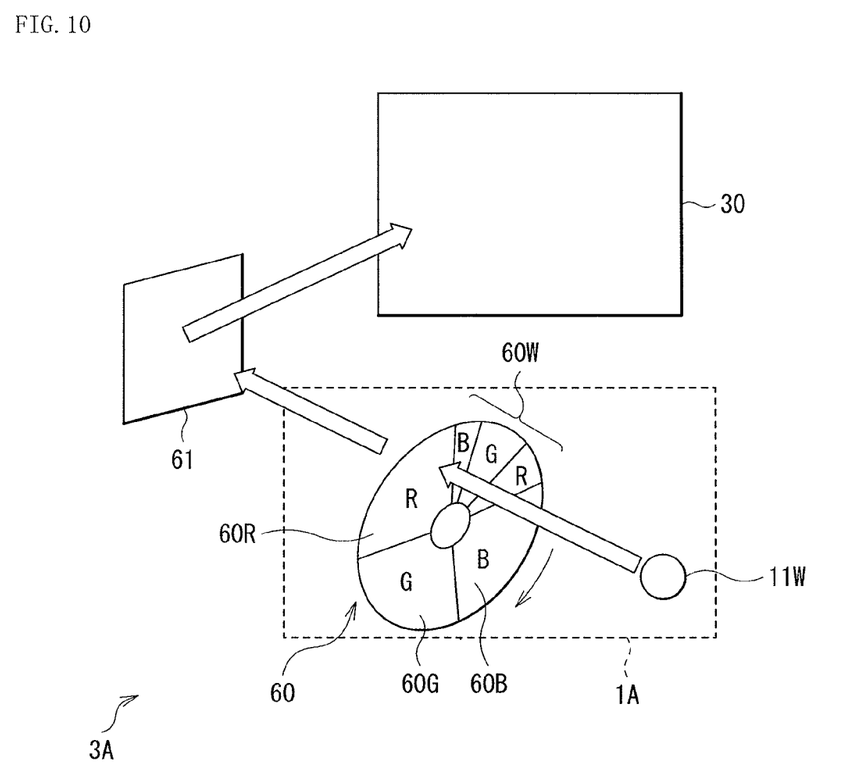
FIG. 10 is a configuration diagram illustrating an example of a display apparatus according to a second embodiment.

For example, as in a display apparatus 3A illustrated in FIG. 10, there may be adopted a configuration including an illumination unit 1A serving as the light source section and a DMD 61 serving as the display device.

The illumination unit 1A includes a white light source 11W, and a color wheel 60 serving as the above-described rotation member.

The white light source 11W is configured by, for example, a white LED.

The color wheel 60 includes a plurality of filter regions. The color wheel 60 includes a red region 60R, a green region 60G, a blue region 60B, and a white region 60W as the plurality of filter regions. The red region 60R, the green region 60G, and the blue region 60B are the single-color regions described above. The white region 60W is the mixed-color region described above. The white region 60W further includes a red region, a green region, and a blue region.

Even in such a configuration of the display apparatus 3A, it is possible to perform the light source control by the RGBW sequential light emission illustrated in, for example, FIG. 3 and FIG. 5.

Further, it is possible to perform the color sequential display in order other than RGBW, by changing the order of the filter regions in the color wheel 60. Furthermore, it is also possible to display a sub-frame image of a mixed color other than the W sub-frame image, by assuming the configuration of the filter region to be a region of another mixed color such as Y (yellow), C (cyan), and M (magenta).

Other configurations, operations, and effects may be substantially similar to those of the display apparatus 3 according to the above-described first embodiment.

3. Other Embodiments

The technology according to the present disclosure is not limited to the descriptions of the foregoing embodiments, and may be modified in a variety of ways.

For example, the present technology may have the following configurations.

(1)

A display apparatus including:

a light source section that outputs a light beam of each of a plurality of predetermined colors;

an image data processing section that generates a sub-frame image of a single color of each of the plurality of predetermined colors by dividing a unit frame into a plurality of sub-frames, on the basis of an input image signal including an image signal of each of the plurality of predetermined colors, and generates a sub-frame image of a mixed color different from the plurality of predetermined colors, on the basis of the image signals of at least two colors among the plurality of predetermined colors;

a display device that modulates the light beam outputted from the light source section, on the basis of each of the sub-frame images generated by the image data processing section; and a light source control section that causes the light source section to output the light beam of the color corresponding to the sub-frame image of the single color, in a period of displaying the sub-frame image of the single color, and causes the light source section to output the light beams of the at least two colors sequentially in time division, in a period of displaying the sub-frame image of the mixed color, within a period of the unit frame.

(2)

The display apparatus according to (1), in which the sub-frame image of the mixed color includes a sub-frame image of white.

(3)

The display apparatus according to (1) or (2), in which the light source control section causes the light source section to sequentially output all the light beams of the respective plurality of predetermined colors in time division at least once or more, in the period of displaying the sub-frame image of the mixed color.

(4)

The display apparatus according to any one of (1) to (3), in which, in the period of displaying the sub-frame image of the mixed color, the light source control section causes the light source section to output the light beam of the same color as the color of the sub-frame image of the single color displayed immediately before the sub-frame image of the mixed color, in a first period resulting from time division.

(5) The display apparatus according to any one of (1) to (4), in which, in the period of displaying the sub-frame image of the mixed color, the light source control section causes the light source section to output the light beam of the same color as the color of the sub-frame image of the single color displayed immediately after the sub-frame image of the mixed color, in a last period resulting from time division.

(6) The display apparatus according to any one of (1) to (5), in which white balance in the period of displaying the sub-frame image of the mixed color and white balance in the unit frame are substantially the same.

(7) The display apparatus according to any one of (1) to (6), in which the light source section includes a plurality of light sources that emits the light beams of the plurality of predetermined colors.

(8) The display apparatus according to any one of (1) to (6), in which the light source section includes
a light source that emits a light beam, and
a rotation member that includes a plurality of single-color regions corresponding to the respective plurality of predetermined colors, and a mixed-color region corresponding to the at least two colors, and outputs a color corresponding to each of the regions by each of the regions being irradiated with the light beam from the light source.

(9) The display apparatus according to any one of (1) to (8), further including a projection optical system that projects the light beam modulated by the display device,
in which the display apparatus is configured as a projection display apparatus.

This application claims the benefit of Japanese Priority Patent Application JP2017-191653 filed with the Japan Patent Office on Sep. 29, 2017 the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

The invention claimed is:

1. A display apparatus, comprising:
a light source section that outputs a light beam of each of a plurality of predetermined colors;
an image data processing section that generates a sub-frame image of a single color of each of the plurality of predetermined colors by dividing a unit frame into a plurality of sub-frames, on a basis of an input image signal including an image signal of each of the plurality of predetermined colors, and generates a sub-frame image of a mixed color different from the plurality of predetermined colors, on a basis of the image signals of at least two colors among the plurality of predetermined colors;
a display device that modulates the light beam outputted from the light source section, on a basis of each of the sub-frame images generated by the image data processing section; and
a light source control section that causes the light source section to output the light beam of the color corresponding to the sub-frame image of the single color, in a period of displaying the sub-frame image of the single color, and causes the light source section to output the light beams of the at least two colors sequentially in time division, in a period of displaying the sub-frame image of the mixed color, within a period of the unit frame, wherein, in the period of displaying the sub-frame image of the mixed color, the light source control section causes the light source section to output the light beam of the same color as the color of the sub-frame image of the single color displayed immediately before the sub-frame image of the mixed color, in a first period resulting from time division.

2. The display apparatus according to claim 1, wherein the sub-frame image of the mixed color comprises a sub-frame image of white.

3. The display apparatus according to claim 1, wherein the light source control section causes the light source section to sequentially output all the light beams of the respective plurality of predetermined colors in time division at least once or more, in the period of displaying the sub-frame image of the mixed color.

4. The display apparatus according to claim 1, wherein the light source section includes a plurality of light sources that emit the light beams of the plurality of predetermined colors.

5. The display apparatus according to claim 1, wherein the light source section includes
a light source that emits a light beam, and
a rotation member that includes a plurality of single-color regions corresponding to the respective plurality of predetermined colors, and a mixed-color region corresponding to the at least two colors, and outputs a color corresponding to each of the regions by each of the regions being irradiated with the light beam from the light source.

6. The display apparatus according to claim 1, further comprising a projection optical system that projects the light beam modulated by the display device,
wherein the display apparatus is configured as a projection display apparatus.

7. The display apparatus according to claim 1, wherein, in the period of displaying the sub-frame image of the mixed color, the light source control section causes the light source section to output the light beam of the same color as the color of the sub-frame image of the single color displayed immediately after the sub-frame image of the mixed color, in a last period resulting from time division.

8. The display apparatus according to claim 1, wherein white balance in the period of displaying the sub-frame image of the mixed color and white balance in the unit frame are substantially same.

9. A display apparatus comprising:
a light source section that outputs a light beam of each of a plurality of predetermined colors;
an image data processing section that generates a sub-frame image of a single color of each of the plurality of predetermined colors by dividing a unit frame into a plurality of sub-frames, on a basis of an input image signal including an image signal of each of the plurality of predetermined colors, and generates a sub-frame image of a mixed color different from the plurality of predetermined colors, on a basis of the image signals of at least two colors among the plurality of predetermined colors;
a display device that modulates the light beam outputted from the light source section, on a basis of each of the sub-frame images generated by the image data processing section; and a light source control section that causes the light source section to output the light beam of the color corresponding to the sub-frame image of the single color, in a period of displaying the sub-frame image of the single color, and causes the light source section to output the light beams of the at least two colors sequentially in time division, in a period of displaying the sub-frame image of the mixed color, within a period of the unit frame, wherein, in the period of displaying the sub-frame image of the mixed color, the light source control section causes the light source section to output the light beam of the same color as the color of the sub-frame image of the single color displayed immediately after the sub-frame image of the mixed color, in a last period resulting from time division.

10. The display apparatus according to claim 9, wherein the sub-frame image of the mixed color comprises a sub-frame image of white.

11. The display apparatus according to claim 9, wherein the light source control section causes the light source section to sequentially output all the light beams of the respective plurality of predetermined colors in time division at least once or more, in the period of displaying the sub-frame image of the mixed color.

12. The display apparatus according to claim 9, wherein white balance in the period of displaying the sub-frame image of the mixed color and white balance in the unit frame are substantially same.

13. The display apparatus according to claim 9, wherein the light source section includes a plurality of light sources that emit the light beams of the plurality of predetermined colors.

14. The display apparatus according to claim 9, wherein the light source section includes
a light source that emits a light beam, and
a rotation member that includes a plurality of single-color regions corresponding to the respective plurality of predetermined colors, and a mixed-color region corresponding to the at least two colors, and outputs a color corresponding to each of the regions by each of the regions being irradiated with the light beam from the light source.

15. The display apparatus according to claim 9, further comprising a projection optical system that projects the light beam modulated by the display device,
wherein the display apparatus is configured as a projection display apparatus.

16. A display apparatus comprising:
a light source section that outputs a light beam of each of a plurality of predetermined colors;
an image data processing section that generates a sub-frame image of a single color of each of the plurality of predetermined colors by dividing a unit frame into a plurality of sub-frames, on a basis of an input image signal including an image signal of each of the plurality of predetermined colors, and generates a sub-frame image of a mixed color different from the plurality of predetermined colors, on a basis of the image signals of at least two colors among the plurality of predetermined colors;
a display device that modulates the light beam outputted from the light source section, on a basis of each of the sub-frame images generated by the image data processing section; and
a light source control section that causes the light source section to output the light beam of the color corresponding to the sub-frame image of the single color, in a period of displaying the sub-frame image of the single color, and causes the light source section to output the light beams of the at least two colors sequentially in time division, in a period of displaying the sub-frame image of the mixed color, within a period of the unit frame, wherein white balance in the period of displaying the sub-frame image of the mixed color and white balance in the unit frame are substantially same.

17. The display apparatus according to claim 16, wherein the sub-frame image of the mixed color comprises a sub-frame image of white.

18. The display apparatus according to claim 16, wherein the light source control section causes the light source section to sequentially output all the light beams of the respective plurality of predetermined colors in time division at least once or more, in the period of displaying the sub-frame image of the mixed color.

19. The display apparatus according to claim 16, wherein the light source section includes a plurality of light sources that emit the light beams of the plurality of predetermined colors.

20. The display apparatus according to claim 16, wherein the light source section includes
a light source that emits a light beam, and
a rotation member that includes a plurality of single-color regions corresponding to the respective plurality of predetermined colors, and a mixed-color region corresponding to the at least two colors, and outputs a color corresponding to each of the regions by each of the regions being irradiated with the light beam from the light source.

* * * * *